3,448,739
DOUBLE LUMEN DIAGNOSTIC
BALLOON CATHETER
William A. Stark, Costa Mesa, and Donald A. Raible,
Corona, Calif., assignors to Edwards Laboratories, Inc.,
Santa Ana, Calif., a corporation of California
Filed Aug. 22, 1966, Ser. No. 574,139
Int. Cl. A61m 25/00, 29/00
U.S. Cl. 128—2.05                     5 Claims

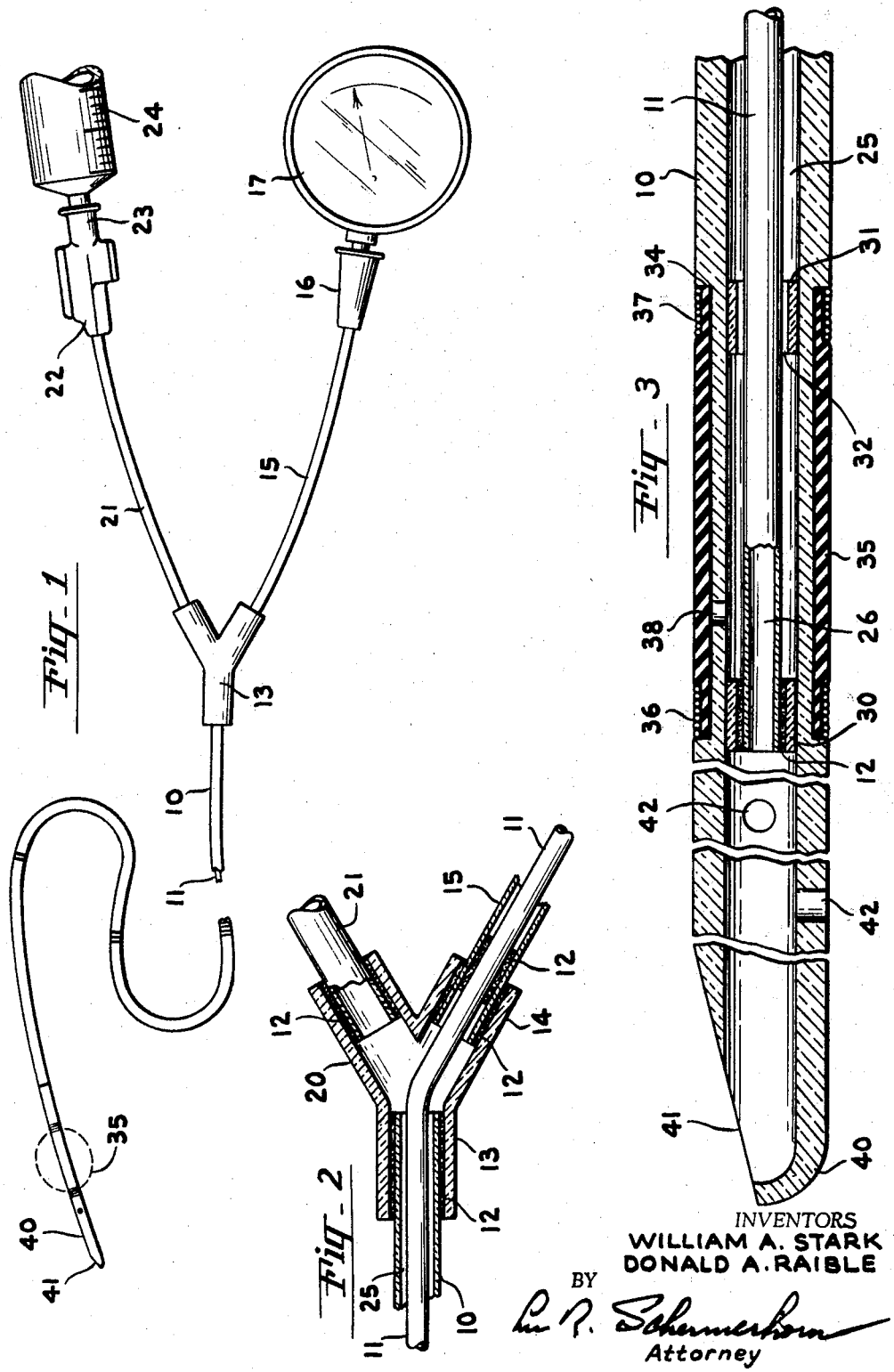

ABSTRACT OF THE DISCLOSURE

An inner plastic tube is disposed within an outer plastic tube. A pair of rigid sleeves within the outer tube provide a solid backing for windings on the ends of a balloon surrounding the outer tube. The inner tube extends through the proximal sleeve with cleaarnce and is anchored and sealed in the distal sleeve. The inner tube communicates with an apertured hollow tip which extends beyond the balloon and the outer tube carries fluid to inflate the balloon.

---

This invention relates to a balloon catheter having a first lumen to carry fluid for inflating the balloon and a second lumen extending through the balloon and communicating with openings in the catheter tip beyond the balloon.

The balloon is used for occluding or partially occluding a vessel or duct and the second lumen may be used to inject an X-ray opaque dye or other chemicals or to provide a means for making a pressure measurement. Such catheters are useful in the urinary system and also in the blood circulatory system. Without such a device, medication administered in blood vessels is rapidly washed away. With the use of a balloon catheter to occlude the vessel, less medication is necessary and the concentration may be more carefully controlled in the area where it is needed. A double lumen balloon catheter can also be used for dilation of membranous tissues and material such as the foraman ovale. The inflated balloon is employed to dilate the tissue and the second lumen is employed to sense intracardiac pressures during positioning of the catheter tip within the various chambers of the heart.

Objects of the invention are to provide an improved double lumen catheter, to provide a double lumen catheter having concentric lumens and to provide means to prevent collapsing of the lumens by the constrictive effects of the bindings which secure the balloon.

The present catheter comprises two plastic tubes, one within the other. A pair of rigid sleeves within the outer tube provides a solid backing for the windings which secure the balloon around the outer tube. The inner tube passes loosely through one sleeve and is anchored in the other sleeve so as to communicate with an apertured hollow tip on the catheter which extends beyond the balloon. Thus, the inner tube communicates with a portion of the vessel which is occluded by the balloon while the outer tube carries fluid to inflate the balloon.

The invention will be better understood and still other objects and advantages will become apparent from the following description of the preferred embodiment shown on the accompanying drawing. Various changes may be made, however, in the details of construction and arrangement of parts and certain features may be used without others. All such modifications within the scope of the appended claims are included in the invention.

In the drawing:

FIGURE 1 is a plan view, with parts broken away, showing a catheter embodying the principles of the invention;

FIGURE 2 is an enlarged sectional view of a portion of FIGURE 1; and

FIGURE 3 is an enlarged sectional view, with parts broken away, showing the balloon and tip portion of the catheter.

The main catheter tube 10 contains therewithin a smaller tube 11. The proximal end of tube 10 is secured by epoxy cement 12, or other suitable means, in the common end of a branching connector such as plastic Y-fitting 13. Tube 11 continues through one branch 14 of the Y-fittting and extends into a larger tube 15. Tube 11 is sealed in tube 15 by means of cement 12 and tube 15 is in turn sealed by cement 12 within the branch 14 as shown in FIGURE 2. The proximal end of tube 15 is equipped with a connector fitting 16 to receive any desired device such as pressure gauge 17. For the administration of dye or other chemicals, a syringe or tube would be connected to the fitting 16 instead of the pressure gauge.

Cemented and sealed within the other branch 20 of the Y-fitting is a tube 21 which communicates with the space between the inside wall of tube 10 and the outside wall of tube 11. Connected with the proximal end of tube 21 is a shutoff valve 22 having an integral connector fitting 23 to receive a syringe 24 for inflating fluid which may be either gas or liquid. Thus, the space between the two tubes 10 and 11 provides an inflatation passageway 25 while the lumen of inner tube 11 provides a second passageway 26 as seen in FIGURE 3. The tubes 10, 11, 15 and 21 are preferably made of a suitable flexible plastic material such as polyvinyl chloride.

The distal end of tube 11 has cemented thereon a short, rigid stop sleeve 30. A rigid clearance sleeve 31 is introduced to the position shown, the inside diameter of sleeve 31 being larger than the outside diameter of tube 11 so as to provide a clearance space 32 for the passage of balloon inflating fluid through passageway 25. The inflating fluid may pass freely through the clearance sleeve 31 but cannot pass beyond stop sleeve 30. Sleeves 30 and 31 are preferably made of stainless steel. They have an outside diameter which allows them to be pushed through tube 10 in assembly with sufficient friction to hold them in adjusted positions temporarily until the balloon is applied.

The outer surface of tube 10 is recessed at 34 to accommodate the thickness of material of balloon 35. The distal end of balloon 35 is secured in the recess by a winding 36 which is applied over the position of stop sleeve 30 and the proximal end is secured in the recess by a winding 37 which is applied over the position of clearance sleeve 31. In assembling the tube 11 and the sleeves 30 and 31 within the tube 10, care is taken to position the two sleeves as shown so that they will underlie end portions of the recess 34 where the windings 36 and 37 are to be applied.

By reason of the rigid backing afforded by the sleeves 30 and 31, the windings may be applied with sufficient tightness to reduce the thickness of the balloon material so that the balloon and the windings will have the same outside diameter as tube 10 to present a smooth exterior surface. The constrictive effect of winding 36 permanently anchors the stop sleeve 30 in position in the tube 10 and thereby also anchors the end of tube 11. In a similar manner, the winding 37 serves to permanently anchor the clearance sleeve 31 against any movement in tube 10.

Tube 10 is provided with a plurality of radial openings 38 in staggered relation around the tube and longitudinally between the windings 36 and 37 to introduce inflating fluid from the passageway 25 into the balloon. When the balloon is inflated without restraint, it assumes an approximately spherical shape as shown in broken lines in FIGURE 1.

Tube 10 extends beyond the balloon to form a hollow tip portion 40 which is in communication with passageway 26 and isolated from passageway 25. This tip portion contains a plurality of openings in staggered arrangement as indicated at 41 and 42 to communicate with the occluded portion of the vessel in which the catheter is inserted. Chemicals may be introduced through the tube 11 into the occluded portion of the vessel or the tube 11 may be utilized to transmit fluid pressure from the occluded portion of the vessel to the gauge 17 or other instrumentality connected with the fitting 16.

Having now described our invention and in what manner the same may be used, what we claim as new and desire to protect by Letters Patent is:

1. A double lumen balloon catheter comprising an outer catheter tube having a concentric balloon thereon and having openings for inflation fluid without said balloon, an inner tube within said outer tube defining an inflation fluid passageway between the two tubes and a second passageway in said inner tube, one of said tubes terminating at the distal end of said balloon and the other tube having an apertured tip end extending beyond said balloon, said second passageway communicating with said apertured tip, a sleeve on said inner tube closing said inflation fluid passageway at the distal end of said balloon, a second sleeve in said outer tube at the proximal end of said balloon, said inner tube passing through said second sleeve with clearance space for the passage of inflation fluid through the sleeve, and windings on the distal and proximal end portions of said balloon securing said balloon to said outer tube and securing said sleeves in said outer tube.

2. A catheter as defined in claim 1 wherein said inner tube terminates at the distal end of said balloon and said outer tube has said apertured tip extending beyond said balloon.

3. A catheter as defined in claim 1, said sleeves being slidable in said outer tube in assembly and having a frictional fit in said outer tube to hold them in adjusted positions therein until said windings are applied.

4. A catheter as defined in claim 1, including a branching connector fitting on the proximal end of said outer tube, and a third tube connected to one branch of said fitting and communicating with said inflation passageway, said inner tube extending through and being sealed in the other branch of said fitting.

5. A catheter as defined in claim 4, including a fourth tube having a distal end connected to said other branch of said fitting, said inner tube communicating with said fourth tube.

References Cited

UNITED STATES PATENTS

| 317,375 | 5/1885 | Kern | 128—246 |
|---|---|---|---|
| 2,701,559 | 2/1955 | Cooper | 128—2 |
| 2,845,930 | 8/1958 | Brown | 128—348 |
| 2,912,981 | 11/1959 | Keough | 128—349 |
| 2,930,377 | 3/1960 | Cowley | 128—344 |

FOREIGN PATENTS

| 517,752 | 3/1955 | Italy. |
|---|---|---|
| 581,453 | 8/1958 | Italy. |

DALTON L. TRULUCK, Primary Examiner.

U.S. Cl. X.R.

128—344, 348

UNITED STATES PATENT OFFICE
CERTIFICATE OF CORRECTION

Patent No. 3,448,739                     Dated June 10, 1969

Inventor(s) William A. Stark and Donald A. Raible

It is certified that error appears in the above-identified patent and that said Letters Patent are hereby corrected as shown below:

Claim 1, column 3, line 16, "without" should read -- within --.

SIGNED AND
SEALED
MAR 24 1970

(SEAL)
Attest:

Edward M. Fletcher, Jr.
Attesting Officer

WILLIAM E. SCHUYLER, JR
Commissioner of Patents